United States Patent [19]

Fallenbeck et al.

[11] 3,966,520
[45] June 29, 1976

[54] METHOD OF ULTRASONICALLY WELDING A CIRCUMFERENTIAL TELESCOPING JOINT

[75] Inventors: Eberhardt G. Fallenbeck, Georgetown; Wayne N. Upright, West Newbury, both of Mass.

[73] Assignee: Branson Ultrasonics Corporation, New Canaan, Conn.

[22] Filed: July 14, 1975

[21] Appl. No.: 595,773

[52] U.S. Cl............................ 156/73.1; 156/580; 228/1; 264/69
[51] Int. Cl.² ................... B32B 31/20; B32B 31/22
[58] Field of Search.................. 156/73.1, 580, 73.4; 264/69; 228/1

[56] References Cited
UNITED STATES PATENTS 3,022,802  2/1962  Lewis.............................. 156/73.1
3,438,824  4/1969  Balamuth......................... 156/73.1
3,728,184  4/1973  Burke et al. ..................... 156/73.1

*Primary Examiner*—Edward G. Whitby
*Attorney, Agent, or Firm*—Ervin B. Steinberg; Philip J. Feig

[57] ABSTRACT

Two telescopingly engaging tubular thermoplastic workpieces are welded together by ultrasonic vibratory energy applied radially. The workpieces are disposed on a mandrel for preventing distorting or collapsing of the opening in the inner workpiece. A tapered hole in the ultrasonic tool in combination with an axial force upon the workpiece provides a radially compressive force upon the outer workpiece to cause intimate contact between the softened workpiece surfaces during welding.

13 Claims, 7 Drawing Figures

FIG. 3A
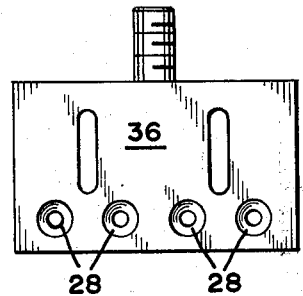
FIG. 3B
FIG. 4
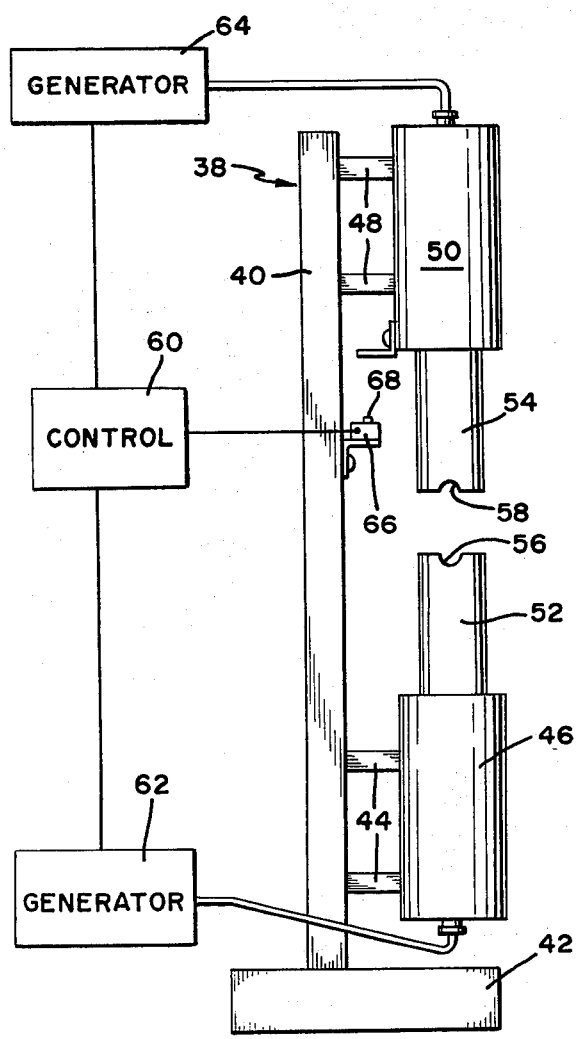
FIG. 5
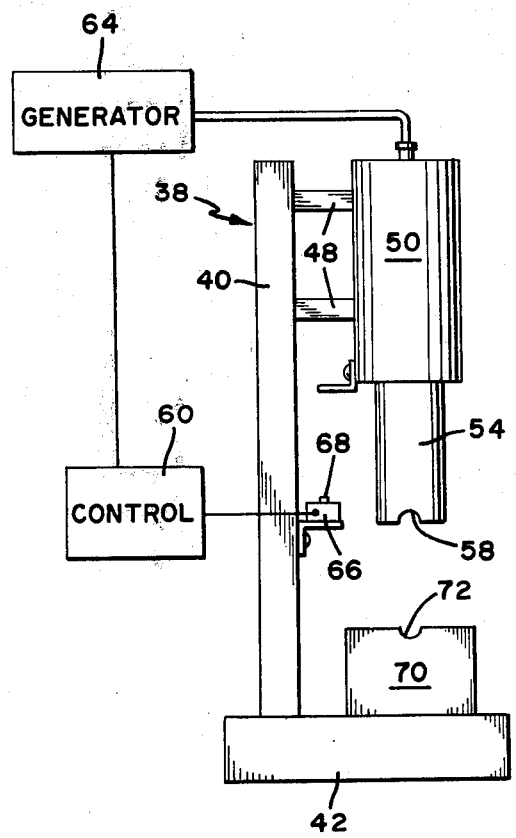

METHOD OF ULTRASONICALLY WELDING A CIRCUMFERENTIAL TELESCOPING JOINT

SUMMARY OF THE INVENTION

The present invention refers to a method of ultrasonically welding two thermoplastic workpieces along telescopingly engaging surfaces. Specifically, two cylindrical thermoplastic workpieces to be joined are placed in overlapping relation upon a mandrel and ultrasonic energy is applied to the workpieces in the overlap region in a direction normal to the longitudinal axis of the mandrel while the mandrel with workpieces thereupon is subjected to rotation in the presence of a radial force acting upon the workpieces. The two workpieces are thereby joined to form a tight, strong, and hermetic seal.

In the manufacture of medical appliances comprising, for example, two or more parts made of plastic material of differing composition or physical characteristics which are sealed together, current practice has been limited to sealing such parts by adhesives. For joining two parts which are in sealing engagement an adhesive or solvent solution is applied to the abutting or overlapping surfaces to be sealed and then the solvent is permitted to cure. This procedure is not only time consuming but may introduce a contaminant (i.e. the adhesive, or the solvent which may be trapped in the seal) to adversely affect the fluid in the appliance. Moreover, certain plastic compositions, such as polyethylene, present problems since most common adhesives will not adhere to them.

The present invention overcomes the heretofore observed problems of sealing two dissimilar tubular members made of synthetic plastic material, one of which may be rigid and the other flexible.

In accordance with the present invention a tubular flexible workpiece made, for example, of low density polyethylene, plasticized polyvinyl chloride or other similar synthetic plastic is placed upon a rigid, typically metallic, mandrel. A second tubular rigid workpiece made of acrylonitrile-butadiene-styrene, polycarbonate, high density polyethylene, polypropylene or any other polymer with characteristics which impart a reasonable degree of rigidity as well as flow and sealing properties is disposed in overlapping relation with the flexible workpiece. The workpieces and mandrel are positioned for contact by a half wavelength resonator (also known as horn, concentrator, mechanical amplitude converter). The horn in turn is coupled to an electroacoustic converter which when excited with electrical energy of a predetermined frequency, typically at a frequency in the range from 1 kHz to 100 kHz, undergoes vibratory motion in a direction along its longitudinal axis. The hammer like high frequency motion of the horn applied to the outer workpiece at the region of overlap. The mandrel supports the inner workpiece for preventing the shrinking of the workpiece and for maintaining the desired dimensional stability of the opening in the workpiece. While the vibratory energy is applied, the mandrel and workpieces are rotated through an arc sufficient for causing the workpieces to melt along the entire circumferential edge of the mating surfaces. The result is a circumferential telescoping joint which forms a tight, strong, and hermetic seal.

In a preferred embodiment the ultrasonic horn contains a circular tapered aperture. The narrower opening of the aperture is sufficiently large to permit the inner flexible plastic tubular workpiece to pass therethrough but to prevent the outer rigid workpiece from also passing through, while the wider opening permits the rigid workpiece to fit within the aperture. The workpieces and the mandrel disposed in the center are located in the aperture and during the welding of the workpieces, when the ultrasonic energy is applied, the mandrel is urged toward the narrow end of the aperture while undergoing rotation for applying a radially compressive force along the edge of the rigid workpiece for assuring a hermetic seal.

A principal object of this invention, therefore, is the provision of a method of ultrasonically welding a circumferential telescoping joint between two thermoplastic workpieces.

Another important object of this invention is the provision of a method of ultrasonically joining a rigid plastic workpiece to a flexible plastic workpiece using ultrasonic energy.

A further object of this invention is the provision of a method of joining two concentrically disposed thermoplastic workpieces using ultrasonic energy.

Another and further object of this invention is the provision of a method of joining a fitting comprising a rigid plastic material to a tube made of a flexible plastic material.

A still further object of this invention is the provision of a method of joining two tubular thermoplastic members having differing diameters.

Further and still other objects of this invention will become more readily apparent when the following description is read in conjunction with the accompanying drawings.

BRIEF DESCRIPTION OF THE DRAWINGS

FIG. 3A is an elevational view of an alternative embodiment of a portion of the apparatus per FIG. 1;

FIG. 3B is an elevational view of another alternative embodiment of a portion of the apparatus per FIG. 1;

FIG. 4 is an elevational view of an alternative embodiment of an apparatus useful for practicing the invention, and FIG. 5 is an elevational view of a further embodiment of an apparatus for practicing the invention.

DETAILED DESCRIPTION OF THE INVENTION

Figure 1:
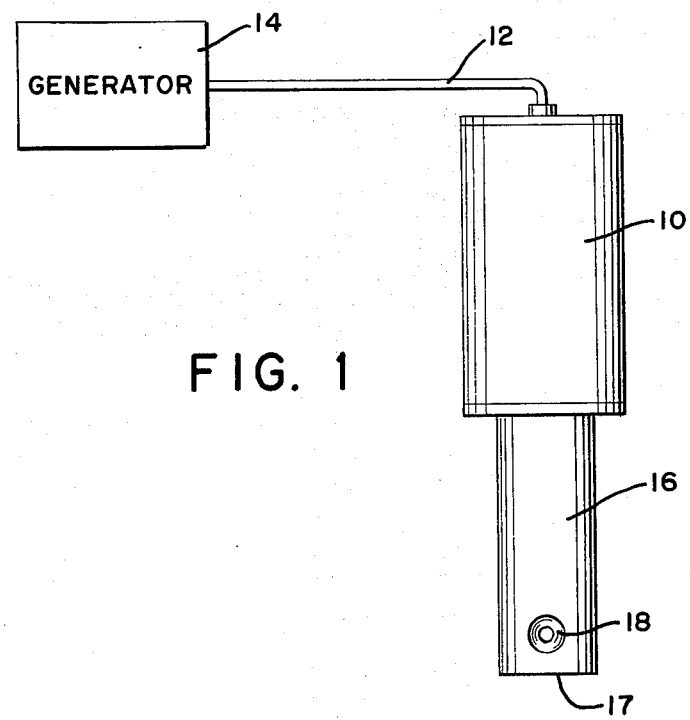
FIG. 1 is an elevational view of an apparatus useful for practicing the present invention.

Referring now to the figures and FIG. 1 in particular, there is shown a high frequency vibratory welding apparatus useful for practicing the present invention. An electroacoustic converter 10 is electrically coupled via a cable 12 to an electrical high frequency generator 14 which, when providing electrical energy of predetermined frequency, causes the converter 10 to transform the applied electrical energy to mechanical vibrations for rendering the horn 16 coupled to the converter 10 resonant along its longitudinal axis. The converter 10 and horn 16 are designed to be resonant at a predetermined frequency, typically, at a frequency in the range between 1 to 100 kHz. Best results are achieved when the frequency is in the ultrasonic range above 16 kHz. The converter 10, typically, includes piezoelectric disk means for converting the electrical energy applied to mechanical vibrations and a converter suitable for this purpose is shown in U.S. Pat. No. 3,328,610, dated June 27, 1967, issued to S. E. Jacke et al., entitled "Sonic Wave Generator".

The horn 16 includes near its output end 17 which is located at an antinodal region of longitudinal motion a tapered aperture 18.

Figure 2A:
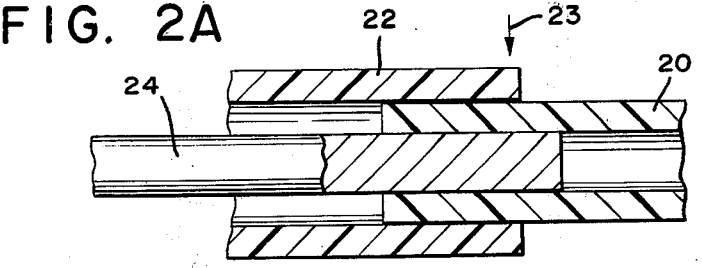
FIG. 2A is an elevational view, in section, of the workpieces prior to welding.

Using the apparatus described it is possible to circumferentially weld a telescoping joint comprising an inner tubular flexible plastic workpiece 20 (FIG. 2A) and an overlying (outer) fitting having a rigid plastic tubular collar 22 or a rigid plastic tubular workpiece having a larger diameter than the flexible workpiece 20. The flexible workpiece 20 is pushed over a tightly fitting mandrel 24, typically a metallic rod, and the rigid workpiece 22 is placed in an overlapping relation with the end portion of a flexible workpiece 20, thus providing a telescoping assembly. Ultrasonic energy is applied to the rigid workpiece 22 along a radial direction, see arrow 23, while the mandrel 24 with workpieces thereupon is undergoing rotation for causing the workpieces to melt along the entire circumferential edge of the workpiece 22 in contact with the workpiece 20. When the ultrasonic energy is removed, the softened material solidifies, forming a strong, tight, and hermetic joint.

Figure 2B:
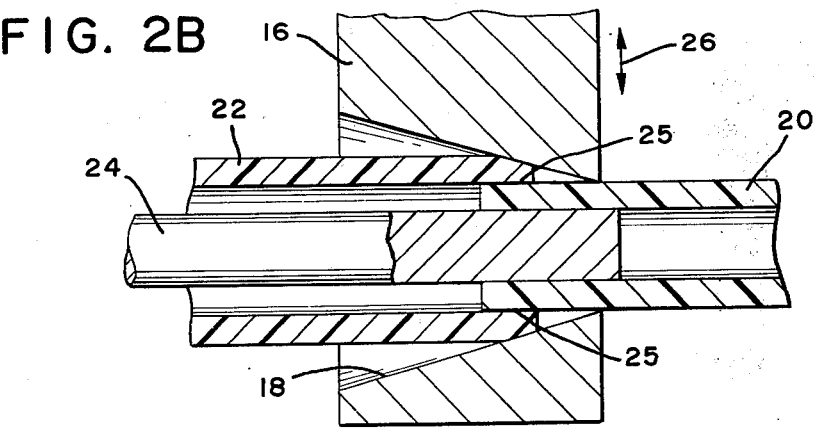
FIG. 2B is an elevational view, in section, of the workpieces during welding.

To ultrasonically weld a circumferential telescoping joint between two workpieces of dissimilar plastic material, referring to FIG. 2B, the flexible smaller tubular workpiece 20 having an inner diameter slightly larger than the outer diameter of mandrel 24 is threaded through the tapered end of the aperture 18 contained in horn 16 and the mandrel 24 is fitted within the opening in the tubing 20. A fitting having a collar 22 or larger tubing of rigid plastic material having an inner diameter slightly larger than the outer diameter of the tubing 20 is disposed over the workpiece 20 and mandrel 24 to form a region of overlap in which the two workpieces are to be welded together to form a unitary medical appliance or the like.

The generator 14 (FIG. 1) is activated for rendering the horn 16 resonant as described above, The horn 16 in the region of the aperture 18 undergoes vibratory motion in the direction of arrow 26 at a predetermined frequency in the range between 1 kHz and 100 kHz, typically 20 kHz with a peak-to-peak displacement amplitude of 2 to 4 mils (50–100 microns). While the horn 16 undergoes vibratory motion, the mandrel 24 and tubing 22 are urged toward the smaller opening of aperture 18. The rigid plastic workpiece 22 begins to melt in the region of contact with the horn 16 under the influence of the applied vibratory energy. As the energy is transmitted, the edge of the outer workpiece 22 engaged by the horn 16 softens as well as the interface area between the workpieces 20 and 22. The mandrel 24 prevents the opening in the workpiece 20 from collapsing under the influence of the ultrasonic energy. The mandrel is manually or automatically rotated about its longitudinal axis through an arc of at least 90 degrees while being urged axially toward the tapered end of the aperture 18. The aperture 18 of the horn 16 applies a radial compressive force about the circumference of the rigid workpiece 22 as the mandrel and workpieces are urged in the axial direction toward the narrow end of the aperture 18, thus causing intimate contact between the softened material at the edge of workpiece 22 and the workpiece 20. As the workpieces are rotated in the aperture 18 increasing portions of the circumference of the workpiece 22 melt on account of the dissipation of sonic energy until softened plastic material is obtained in the circumferential region between workpiece 20 and horn 16. When the mandrel completes the predetermined rotation, the generator 14 is deactivated and the horn ceases vibrating. As the softened workpiece material solidifies a fusion bond is created between the workpieces. The mandrel 24 and the appliance are withdrawn from the horn 16 as the tubing 20 passes through the aperture 18 toward the left, see FIG. 2B. The tubing 20 is severed after a desired length has passed through the aperture 18.

The resulting workpiece exhibits a tight, strong, hermetic joint between the tubular collar 22 and flexible tubing 20. In another modification, a first tubular flexible plastic workpiece is disposed on a mandrel concentrically within a second rigid tubular plastic workpiece and both workpieces are welded to each other in the manner described above.

It will be apparent that the aperture 18 is designed for providing that the smaller opening exhibits a diameter greater than that of the outer diameter of the tubing 20 but less than the outer diameter of the rigid workpiece 22 and that the larger opening of the aperture 18 is wider than the outer diameter of the rigid workpiece 22.

In FIG. 3A an alternative embodiment of the apparatus per FIG. 1 is shown in which a horn 34 is constructed for retaining at its output end an interchangeable welding tip 30 having an aperture 32 dimensioned for use with tubing 20 of a predetermined diameter. In FIG. 3B a slotted bar horn 36 is shown which can be coupled to the electroacoustic converter 10 in place of the horn 16. A plurality of tapered apertures 28 are disposed near the antinodal region of the horn 36 either for simultaneously welding a plurality of workpieces or for welding workpieces having different diameters.

While in the foregoing description a method and apparatus for welding a fitting to a flexible tubing has been described, an inherent limitation resides in the fact that the tubing 20 is drawn through the aperture 18 after the weld is completed. It will be obvious that when using the apparatus per FIGS. 1, 3A and 3B a weld can be made at only one end of the tubing 20.

In FIG. 4 an alternative embodiment for welding a circumferential telescoping joint is illustrated which permits the joining of workpieces at both ends of a length of flexible tubing. A stand 38 comprising a vertical column 40 and base 42 supports via a mounting means 44 a stationary electroacoustic converter 46 and supports moreover via a mounting means 48 a movable converter 50. Coupled to each converter 46 and 50 is a respective horn 52 and 54 having a tapered recess 56 and 58 dimensioned for receiving the workpieces to be welded. The mounting means 48 is coupled to motive means (not shown), such as fluid actuated means, for causing the converter 50 to be lowered along the column 40 from the raised position shown toward the stationary converter 46 and horn 52 responsive to a signal from the control unit 60. When the horn 54 is lowered toward the horn 52, each respective recess 56 and 58 engages the workpiece 22 by an angle less than 180° and the horns are separated by a small gap to avoid a motor generator coupling condition between the converters 46 and 50. The high frequency electrical generators 62 and 64 coupled to control unit 60 are actuated for energizing the respective converters 46 and 50 after the converter 50 is lowered toward the horn 52. The generators 62 and 64, while shown schematically as individual generators, may be replaced by a single generator coupled to both converters 46 and 50. While the stand is shown schematically in FIG. 4, the stand assembly is substantially as shown in U.S. Pat. No. 3,790,059 issued to S. E. Jacke et al, dated February 5, 1974 entitled "Ultrasonic Apparatus".

To ultrasonically weld a circumferential telescoping joint the workpieces to be joined are disposed on a mandrel to form an assembly as described above. The assembly is then disposed in the tapered recess 56 located substantially at an antinodal region of vibratory motion along the longitudinal axis of the horn 52. The control unit 60 is activated for transmitting a signal to the motive means for causing a lowering of the converter 50 toward the horn 52. The converter 50 is coupled to the horn 54 which has a corresponding tapered recess 58 also disposed substantially at an antinodal region of vibratory motion traveling along the longitudinal axis of the horn 54. The recesses in the horns 52 and 54 are located for providing when the converter 50 is disposed at its lowermost position a tapered aperture similar to that shown in FIG. 2B, however, a small gap between the horns exists for the reasons noted heretofore. The distance of travel from the raised position is adjustable for welding workpieces of various dimensions. When the converter 50 reaches the adjustable stop 66 while being lowered, switch button 68 disposed on stop 66 is actuated for providing a signal to the control unit 60. Upon receipt of the signal, the motive means is stopped and the high frequency electrical generators 62 and 64 are activated. The electroacoustic converters 46 and 50 convert the applied electrical energy to vibratory energy and couple the vibratory energy to the respective horns 52 and 54. While the vibratory energy is applied to the workpieces, in the present embodiment, at two diametrically opposed locations along the circumference of the workpiece, the workpiece assembly and mandrel are rotated through an arc of at least ninety degrees. The manner of welding the workpieces together is as described above in conjunction with FIG. 2B.

In a preferred embodiment the mandrel is coupled to a chuck rotated by a motor through a predetermined arc during the weld operation. The motor engages the chuck when the converter 50 reaches the stop 66 responsive to a signal from control unit 60 to the motor. The speed of the motor is adjusted for causing the workpieces to rotate through a predetermined arc during the weld time interval, i.e. the time during which the generators 62 and 64 are activated. At the end of the weld cycle the motor stops the chuck and retracts to be disengaged from the chuck. After a period of time, sufficient for permitting the softened workpiece material to solidify, the welded assembly is removed.

It will be apparent that using the apparatus shown in FIG. 4 welding of fittings or the like at both ends of a flexible plastic workpiece can be accomplished since there is no requirement to pass the workpieces through an aperture disposed in a horn.

In a further modification, FIG. 5, the stationary converter 46 and horn 52 are replaced by a tuned anvil 70. The tuned anvil 70 has a tapered recess 72 similar to the recess 58 in the horn 52 for receiving the workpiece assembly. The method of welding is identical to the description contained hereinabove in relation to FIG. 4.

While in the embodiment per FIG. 5 a tuned anvil is shown, a conventional non-tuned anvil can be used also. It will be apparent that when using a tuned anvil 70, a rotation of at least 90° is sufficient for welding a hermetic joint between the workpieces, whereas by using a non-tuned anvil a rotation of at least 180° is required.

While in the foregoing description a preferred method of ultrasonically welding a circumferential telescoping joint has been described it will be apparent to those skilled in the art that further modifications may be made without deviating from the broad principle of the invention which shall be limited solely by the scope of the appended claims.

What is claimed is:

1. The method of welding two thermoplastic workpieces, an outer workpiece and an inner workpiece, along telescopingly overlapping surfaces comprising the steps of:
   disposing the workpieces to be joined in telescopically overlapping surface relation with one another on a mandrel;
   applying ultrasonic vibratory energy to the overlapping surfaces in a generally radial direction relative to the axis of the mandrel, and
   providing a compressive force in a substantially radial direction along the circumference of the outer workpiece while rotating the workpieces and said vibratory energy is applied for urging the workpieces into forced contact and causing responsive to said energy and force a butt joint between the overlapping surfaces of said workpieces.

2. The method as set forth in claim 1, said workpieces being tubular, applying ultrasonic vibratory energy comprising the provision of a horn having a tapered circular aperture at or near its antinodal region of longitudinal motion, the larger opening of the aperture being larger than the outer diameter of the outer workpiece and the smaller opening being larger than the outer diameter of the inner workpiece and smaller than the outer diameter of the outer workpiece, and disposing said overlapping surfaces in said aperture.

3. The method as set forth in claim 2, and simultaneously urging the workpieces in axial direction toward the narrower opening of said aperture for applying a compressive force in a substantially radial direction along the circumference of the outer workpiece.

4. The method as set forth in claim 3, rotating said workpieces comprising rotation through an arc of at least 90°.

5. The method as set forth in claim 1, applying said ultrasonic vibratory energy comprising: providing a pair of horns each having a recess in its respective frontal surface for receiving therein the workpieces and disposing said horns at two substantially diametrically opposed locations around the circumference of the workpieces.

6. The method as set forth in claim 5, rotating said workpieces comprising rotation through an arc of at least 90°.

7. The method as set forth in claim 1, applying ultrasonic vibratory energy comprising the provision of a horn contacting the workpieces while the workpieces are disposed in a recess in a tuned resonant anvil.

8. The method as set forth in claim 7, rotating said workpieces comprising rotation through an arc of at least 90°.

9. The method as set forth in claim 1, applying ultrasonic vibratory energy comprising the provision of a horn having a recess in the frontal surface contacting the workpieces while the workpieces are in a recess in an anvil.

10. The method as set forth in claim 9, rotating said workpieces comprising rotation through an arc of at least 90°.

11. The method as set forth in claim 1, the outer workpiece being a rigid plastic material and the inner workpiece being a flexible plastic material.

12. The method as set forth in claim 11, the outer workpiece being a fitting having a collar whose inner diameter is dimensioned to slide over the outer diameter of the inner workpiece, and the inner workpiece being a tubular workpiece.

13. The method as set forth in claim 11, the outer workpiece being a tubular workpiece dimensioned to slide over the outer diameter of the inner workpiece.

* * * * *